(12) United States Patent
Finkel

(10) Patent No.: US 7,647,945 B2
(45) Date of Patent: Jan. 19, 2010

(54) BAFFLE FOR COOLANT PASSAGES IN PLASTIC INJECTION MOLDS

(76) Inventor: Brian Finkel, 4883 Omena Ct., Sterling Heights, MI (US) 48314

( * ) Notice: Subject to any disclaimer, the term of this patent is extended or adjusted under 35 U.S.C. 154(b) by 285 days.

(21) Appl. No.: 11/829,496

(22) Filed: Jul. 27, 2007

(65) Prior Publication Data

US 2009/0028985 A1    Jan. 29, 2009

(51) Int. Cl.
   *B29C 45/73* (2006.01)
(52) U.S. Cl. .............. 138/42; 138/38; 138/40; 425/552; 249/79; D10/71
(58) Field of Classification Search ............. 138/38, 138/89; 425/552; 249/205, 79; 165/DIG. 525
   See application file for complete search history.

(56) References Cited

U.S. PATENT DOCUMENTS

| D136,046 | S | * | 7/1943 | K. R. Downer | D7/673 |
|---|---|---|---|---|---|
| 2,770,011 | A | | 11/1956 | Kelly | 425/563 |
| 3,548,863 | A | | 12/1970 | Stippich | 137/340 |
| 3,760,874 | A | | 9/1973 | Boskovic | 165/177 |
| 4,093,188 | A | | 6/1978 | Horner | 366/336 |
| 4,111,258 | A | | 9/1978 | Jahns et al. | 165/300 |
| 4,655,280 | A | | 4/1987 | Takahashi | 165/47 |
| 4,750,326 | A | | 6/1988 | Kruse et al. | 60/253 |
| 4,800,953 | A | | 1/1989 | Veldhoff | 165/142 |
| 4,966,544 | A | | 10/1990 | Mitake | 425/552 |
| 5,830,515 | A | | 11/1998 | Pleasant et al. | 425/192 R |
| 5,945,140 | A | * | 8/1999 | Lin | 425/552 |
| 6,168,415 | B1 | | 1/2001 | Pleasant et al. | 425/552 |
| D448,687 | S | * | 10/2001 | Landwerlen | D10/71 |
| D529,828 | S | * | 10/2006 | Aspengren et al. | D10/71 |
| 7,159,837 | B2 | | 1/2007 | Richards | 249/205 |

* cited by examiner

*Primary Examiner*—Patrick F Brinson
(74) *Attorney, Agent, or Firm*—Jay Schloff

(57) ABSTRACT

An baffle plug comprising a base and a blade extending therefrom. The baffle plug is used in a bore to divide the bore into longitudinally extending passages and cause the liquid to flow serially back and forth through the bore. The blade may comprise various fluid directing structures providing for efficient fluid flow across the surfaces of the blade. The blade may also comprise one or more structures which create turbulent flow of the fluid flowing across the surface of the blade.

7 Claims, 6 Drawing Sheets

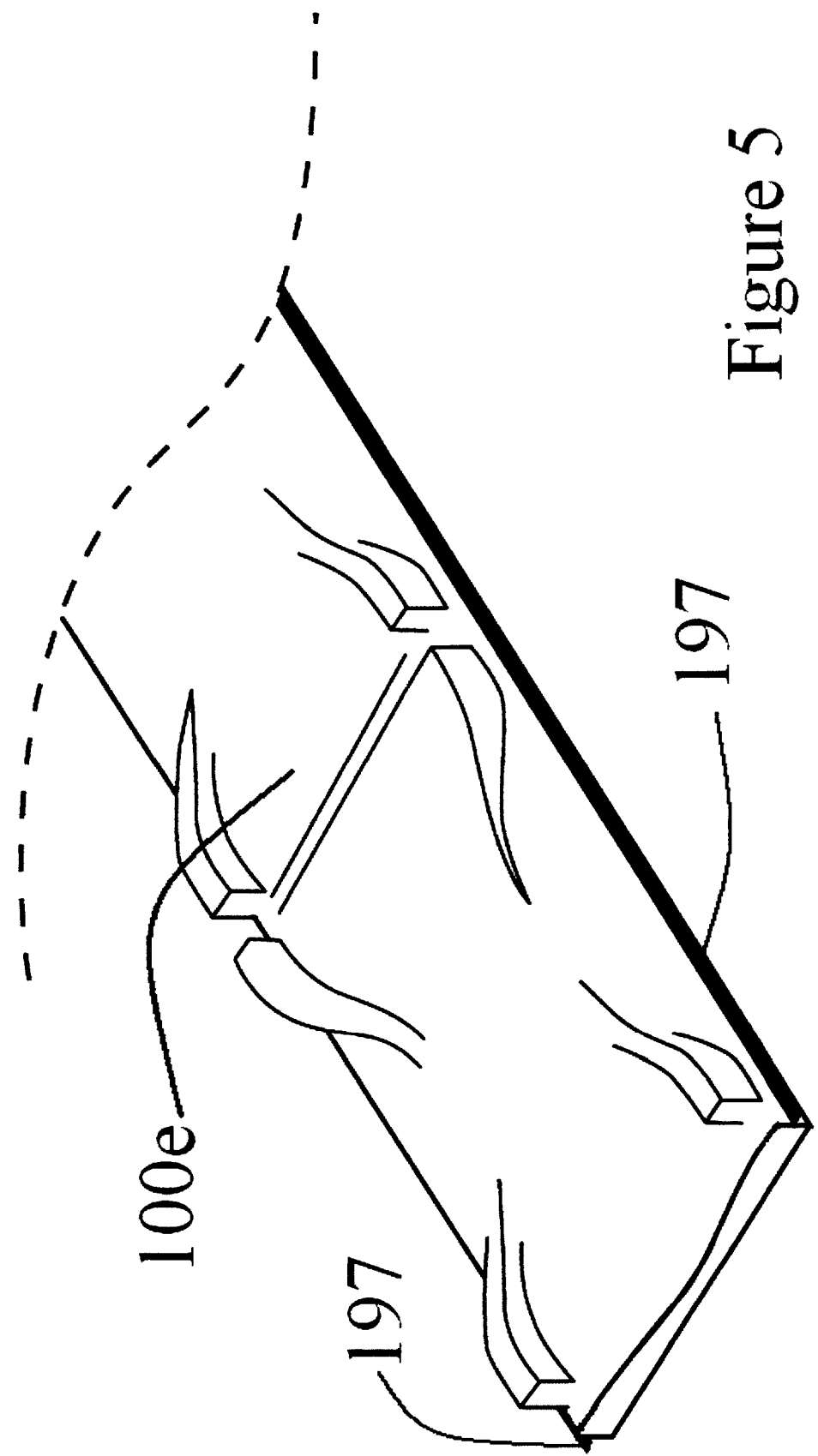

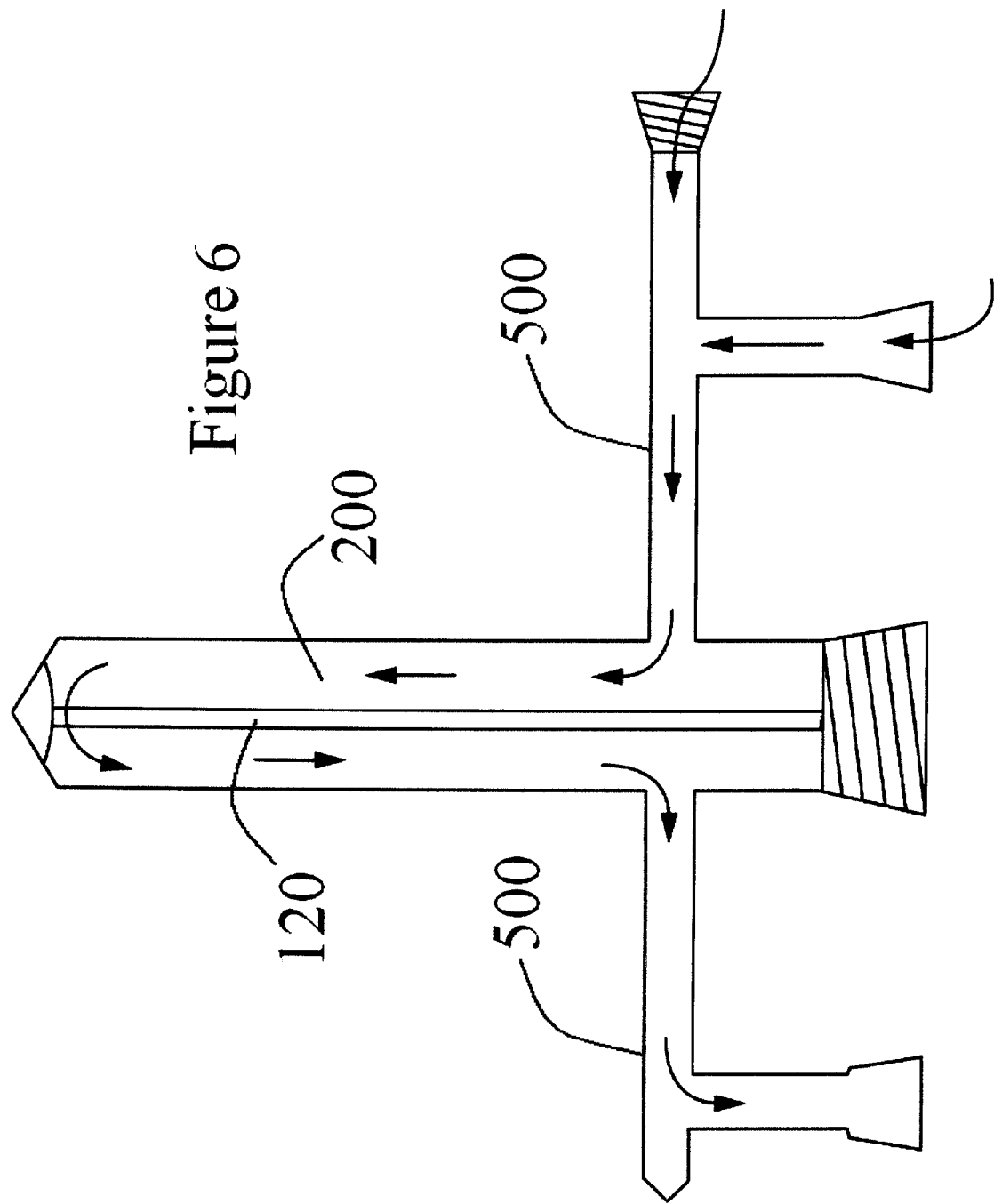

BAFFLE FOR COOLANT PASSAGES IN PLASTIC INJECTION MOLDS

FIELD OF THE INVENTION

The present invention relates to devices for adjusting and maximizing the flow of fluid through a passage. More particularly, the present invention relates to a baffle for regulating the flow of fluid through a bore in plastic injection molds.

BACKGROUND

Plastic molding machines involve the injection of heated material into a die in order to form a desired product. By necessity, fluid must be circulated through such dies, particularly, through bores in the dies, in order to maximize heat transfer between the dies and the circulating liquid. To improve fluid flow in and out of the bore, a baffle is inserted into the bore to divide the bore into separate longitudinal passages. The separate passages are intended to achieve a desired consistency of fluid flow and fluid temperature within the bore.

Such bores extend longitudinally into the die. To maximize the desired consistency of fluid flow and temperature throughout the bore, an effective seal between the separate passages formed by the inserted baffle is preferred. Due to their machined nature, bores and baffles will exhibit structural inconsistencies and will therefore be difficult to mate to achieve the effective seal. That is, the walls of the bore and the edges of the baffle must join to create a seal that will control the flow of fluid in and out of the bore. If there is a leaky seal, the fluid from the separate chambers will mix, and the baffle will not perform its intended function of regulating flow through the bore.

Baffles known in the art traditionally feature flat blade portions. Such a flat orientation generally performs the function of separating a bore into at least two passages, however, that flat structure fails in other regards. For instance, the flow of liquid against the flat baffle may cause the baffle to move from its initial position in the board such any seal between the edges of the baffle and the wall of the bore is broken. Furthermore, the flat surface is inefficient in obtaining a consistent and turbulent fluid flow in and out of the bore in that the fluid will enter the bore perpendicularly to the intended flow path. The flat surface of the baffle does little to direct the fluid along the intended flow path. Furthermore, the flat surface does little to disrupt the flow of the fluid against itself, which disruption would be desirable to increase the distribution of heat throughout the fluid.

Baffles are also often made of metal or brass materials or extruded materials. To perform properly, baffles must be measured and cut to an appropriate length so as to effectively mate with the bores in which they are to be inserted. Baffles made of metal and brass require measuring, cutting, and grinding before the baffle can be installed in a bore. Not only is this installation a time-consuming process, it can be an imprecise effort that detrimentally affects the fit and performance of the baffle within the bore.

Furthermore, baffles made of metal and brass only can only be manufactured with a flat blade. That is, the blade of a brass or steel baffle cannot have ribs or bumps that would create a non-flat surface of the blade. As discussed above, the flat blade fails to increase turbulence in the fluid passing through a bore such that cooling of the fluid is not increased. Baffles of steel and brass composition also do not permit material (e.g., rubber) to be overmolded on the surface of the steel or brass baffle, thus, such baffles cannot incorporate a rubber-edged blade to improve the seal between the baffle and the bore into which the bore inserts.

U.S. Pat. No. 43,548,863 (Stippich) discloses an elongated plastic stem with a threaded plug at one end thereof and fins radiating therefrom. The stem is screwed into the open end of a liquid circulating bore in a die to divide the bore into longitudinally extending passages and cause the liquid to flow serially back and forth within the bore. The Stippich disclosure involves fins of substantially flat orientation, which orientation does not increase the turbulence in the liquid directed by the disclosure and flowing through the bore.

U.S. Pat. No. 3,760,874 (Boskovic) discloses a heat exchange fluid baffle comprising an extruded blade. The blade comprises a main central body section that has spaced apart longitudinal edges with sufficient flexibility to bend and spread as the blade is press-fitted into a mold aperture. Boskovic likewise involves fins of substantially flat orientation, which orientation does not increase the turbulence in the liquid directed by the disclosure and flowing through the bore.

U.S. Pat. No. 4,800,953 (Veldhoff) discloses a baffle for partitioning fluid circulating passages. The baffle is held in position by resilient arms that project outwardly from the baffle and are received fully within a passage that is separate from the fluid circulating passage. While the Veldhoff disclosure is intended to improve securing a baffle in a passage, its incorporation of arms causes unnecessary complication in the installation and configuration of the baffle.

U.S. Pat. No. 5,830,515 (Pleasant, et al.) discloses mold insert including a baffle with a blade that fits within a liquid receiving bore in a plastic injection mold. Fins project outwardly from the faces of the blade in order to create turbulence in liquid flowing into and out of the bore. The '515 patent attempts to address the need for improving the efficiency of heating and or cooling of the mold insert, however, the fins of the '515 patent disrupt the flow sufficiently to require a user to increase the pressure of fluid entering the bore over the pressure otherwise required to circulate fluid into and out of a bore into which a flat-bladed baffle has been inserted. This requirement of increased pressure may require the incorporation of a compressor, which incorporation necessitates additional equipment and energy to operate the '515 invention. Similar problems are associated with the disclosure made in U.S. Pat. No. 6,168,415 to Pleasant.

U.S. Pat. No. 7,159,837 (Richards) discloses a baffle that offers acceptance of greater torque over the prior art in the installation of the baffle into a liquid receiving bore. While the Richards disclosure improves the manner in which the user can secure the baffle in the threaded receiving portion of a bore, it does not address the other problems associated with installation such as measuring and fitting the baffle into the bore.

Thus, what is needed is an improved baffle device that overcomes the shortcomings of the prior art, while at the same time improving on the existing performance of the prior art.

SUMMARY OF THE INVENTION

Disclosed herein is a baffle plug comprising a base, and a planar blade extending outwardly from said base. The planar blade having a first side and a second side whereby at least one of the sides has at least one fluid directing channel longitudinally extending along at least a portion of the length of the planar blade. The at least one fluid directing channel may comprise a single channel centrally disposed along the axis of the planar blade. The at least one fluid directing channel may have a concave shape. The planar blade may have a plurality of peripheral protrusions disposed along at least a portion of the periphery of at least one side of the planar blade. The plurality of peripheral protrusions may be disposed in a wave-like arrangement along at least a portion of the periphery of the planar blade. At least one side of the planar blade may have a series of marked length gradations on the surface thereof. At least a portion of the marked length gradations may comprise a lateral groove extending at least a portion of the width of the planar blade. The surface of at least one side of said planar blade may include one or more turbulence creating structures selected from the group consisting of undulations, ribs, and a rough surface. One or more of the edges of the blade may be overmolded with a rubber-type material having an elasticity less than the elasticity of the blade material. One or more edges of the blade may include a tapered portion. The material used to form the baffle plug may comprise a thermoplastic polymer. The material used to form the baffle plug may comprise 33 to 66 wt % of a thermoplastic polymer and 33 to 66 wt % glass filled nylon. The nylon may contain 44% glass.

BRIEF DESCRIPTION OF THE DRAWINGS

FIG. 5, is a depiction of a baffle plug in accordance with the present invention including a blade with a tapered edge.

FIG. 6, is a depiction of an injection molding machine using a baffle plug in accordance with the present invention.

DETAILED DESCRIPTION OF THE DISCLOSURE

In accordance with the present invention, there is provided a baffle plug for directing the flow of fluid through a bore. The baffle plug may be particularly used in bores for cooling plastic injection molds. The design of the baffle provided for efficient fluid flow through the bore. The baffle design also provides for effective thermal management of the fluid flowing through the bore to provide for improved cooling, particularly in injection molding machines.

Figure 1:
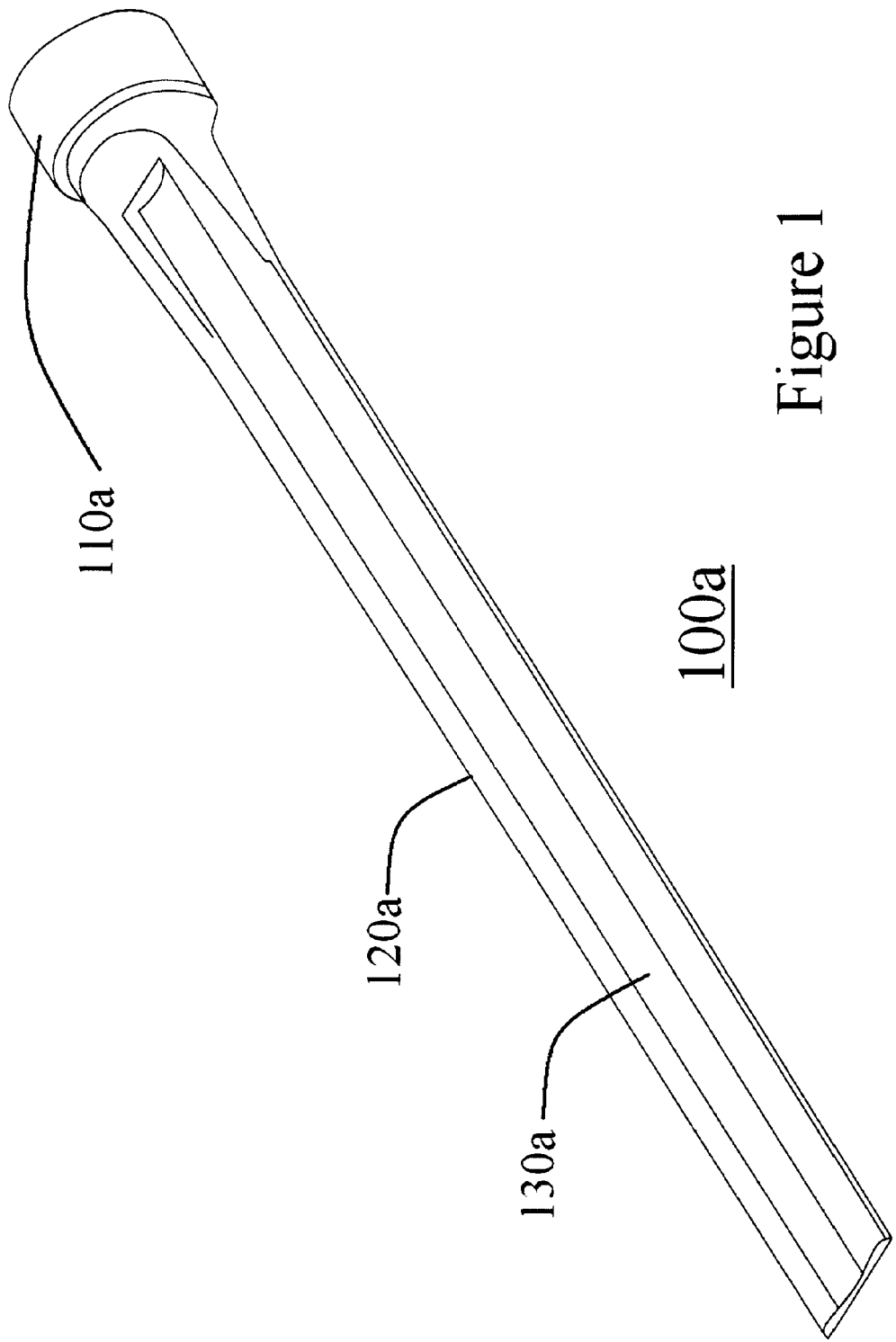
FIG. 1, is depiction of a baffle plug in accordance with the present invention.

A depiction of a baffle plug in accordance with the present invention is depicted in FIG. 1. The baffle plug 100a in accordance with the present invention generally comprises a base 110a and a blade 120a extending therefrom. The cross section of the baffle plug 100a should have a shape similar to the cross section of the bore. For example a cylindrical base should be used with a cylindrical bore and a square base should be used with a square bore. For a cylindrical base, the exterior of the base may be threaded to allow the base to engage the threaded interior of a cylindrical bore such that the base may be screwably attached to the bore. The threads of the base may include hollowed-out portions or recesses which aid in engagement with the threads of the bore. During engagement with the bore, the recesses are collapsed by the engagement of the base with the threads on the inner surface of the bore as the head is rotated. When the baffle is fully rotated into position, the collapsed recesses serve to secure the baffle in place. The side of the base opposite the blade may have a centrally located recess having a polygonal cross section. The recess allows installation of the baffle plug into the bore via use of an Allen wrench or similar tool. The baffle may also be driven into place, without rotation, by using a suitable tool such as a mallet or hammer.

The blade 120a is a generally planar member having a first side and a second side. The first side and second side of the blade 120a may be identical or differ in structure. When installed into a bore, the blade 120a separates the bore into an inlet passageway and an outlet passageway. When installed in a bore, the blade 120a does not fully extend to the bottom of the bore which allows fluid to flow from the inlet passageway to the outlet passageway.

At least one side of the blade 120a may have at least one fluid directing channel 130a longitudinally extending at least a portion of the length of the blade 120a. The fluid directing channel 130a increases the efficiency at which liquid flowing into the conduit is received and flows across the sides of the blade. Preferably, the fluid directing channel 130a has a concave shape. Where only one fluid directing channel 130a is disposed a side of the blade 120a, the fluid directing channel 130a is centrally disposed along the longitudinal axis of the blade 120a.

Figure 2:
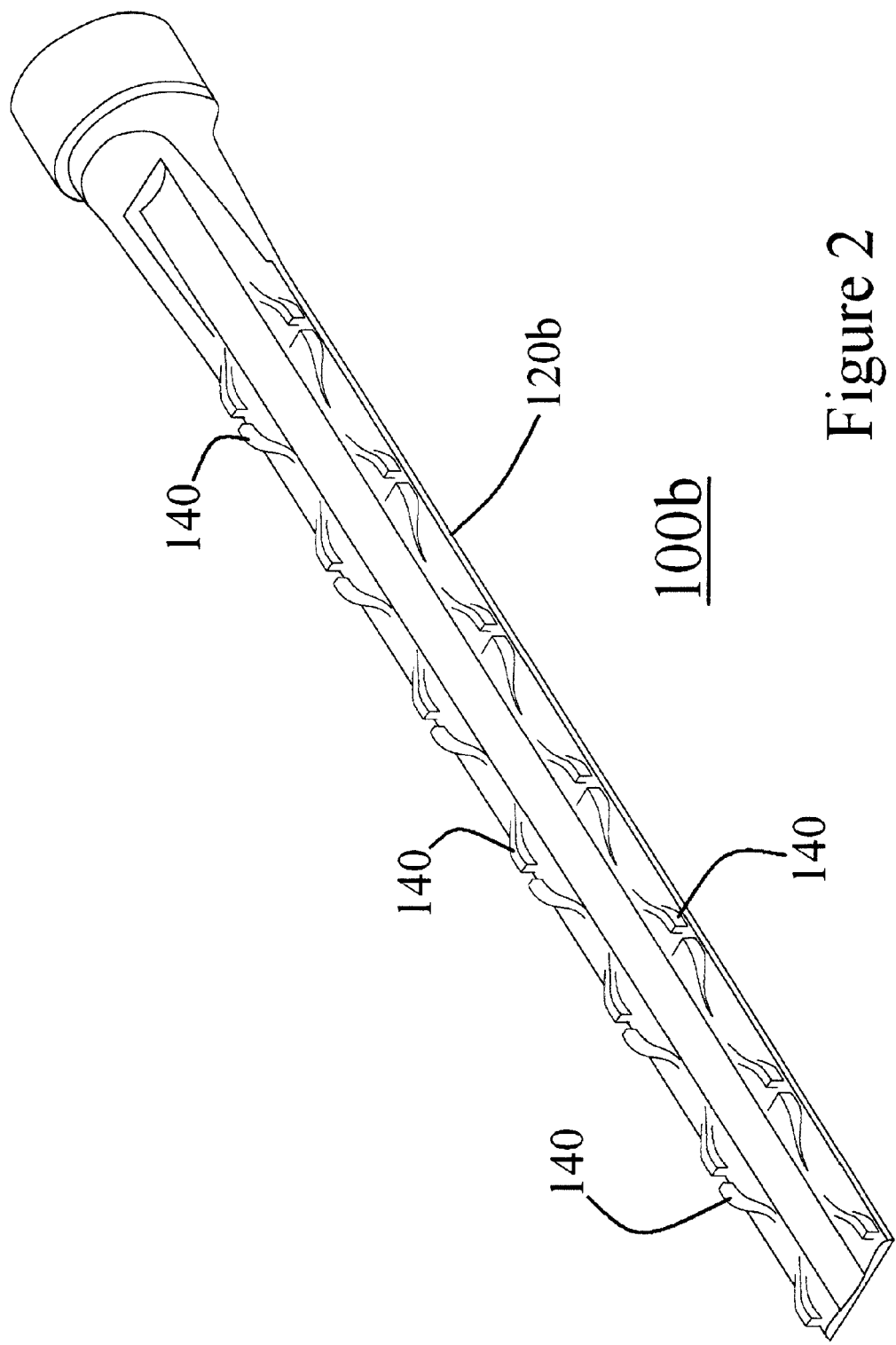
FIG. 2, is depiction of a baffle plug in accordance with the present invention having a plurality of peripheral protrusions.

As shown in FIG. 2, the blade 120b of the baffle plug 100b may have a plurality of protrusions 140 disposed along the periphery of the blade 120b. Each of the protrusions 140 extends outwardly from the blade 120b. Each of the peripheral protrusions 140 may have an arcuate shape. When arranged along the periphery of the blade 120b, the peripheral protrusions 140 may be disposed in a wave-like arrangement. The arcuate shape and wave-like arrangement of the peripheral protrusions 140 act to increase turbulence of the fluid flowing over the surface of the blade 120b. The peripheral protrusions 140 may also direct the fluid away from the edges of the blade 120b toward the center of the blade 120b to optimize fluid flow through the bore. Such medially-directed flow also serves to minimize the loss of any fluid through the blade-bore wall junction. The height of the peripheral protrusions 140 may be varied as needed to achieve the desired turbulence. Furthermore, the height of the peripheral protrusions 140 may be varied within each peripheral protrusion 140.

Figure 3:
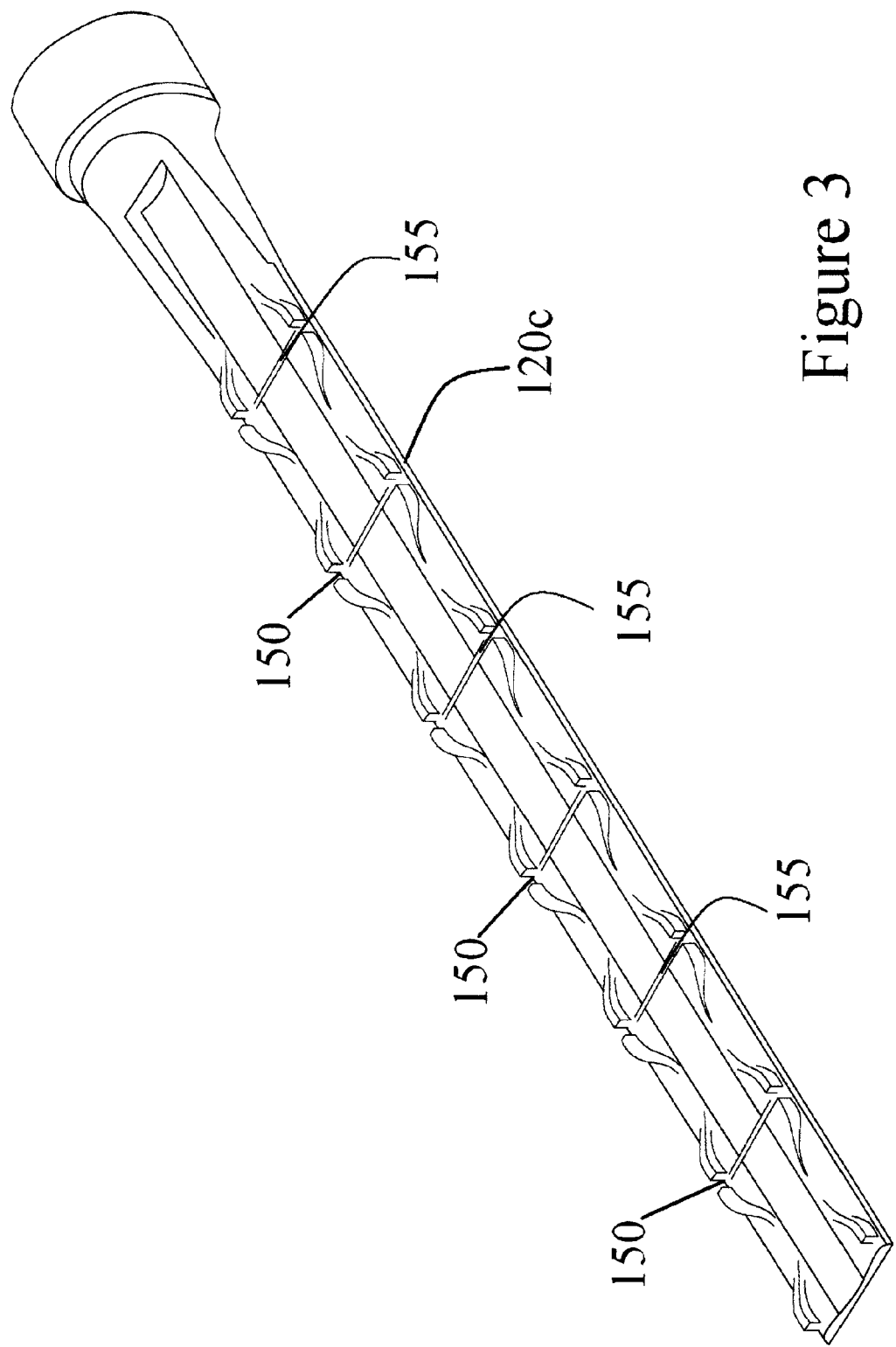
FIG. 3, is depiction of a baffle plug in accordance with the present invention having a series of marked length gradations.

As shown in FIG. 3, at least one side of the blade 120c may have scale including a series of marked length gradations 150 which may be used to determine the length of the blade without the need to for measuring. The scale may be marked in metric units (mm, cm, m) or SI units (inch, foot, yard). Alternatively, one side of the blade 120c may be marked in SI units and the other side may be marked in metric units. The length scale on the blade allows for quick determination of the length of the blade prior to installation into the bore. At least a portion of the gradations 150 may comprise a lateral groove 155 at least partially extending the width of the blade. Preferably the depth of the grooves 155 is less than or equal to a quarter of the thickness of the blade 120c. The lateral grooves 155 aid in cutting of the blade by providing a thinner cutting section of the blade. The gradations 150 of the blade 120c allow for simple adjustment of the length of the blade 120c to fit bores of varying lengths. The blade 120c may be cut to the determined length with snips, scissors, or any other cutting device. Furthermore, the gradations 150 may allow the blade 120c to be precisely broken over the edge of a surface such as a table or bench. In addition to aiding in measuring and cutting the blade 120c, the grooves 150 may also increase the turbulence of the fluid flowing over the surface of the blade 120c.

Figure 4:
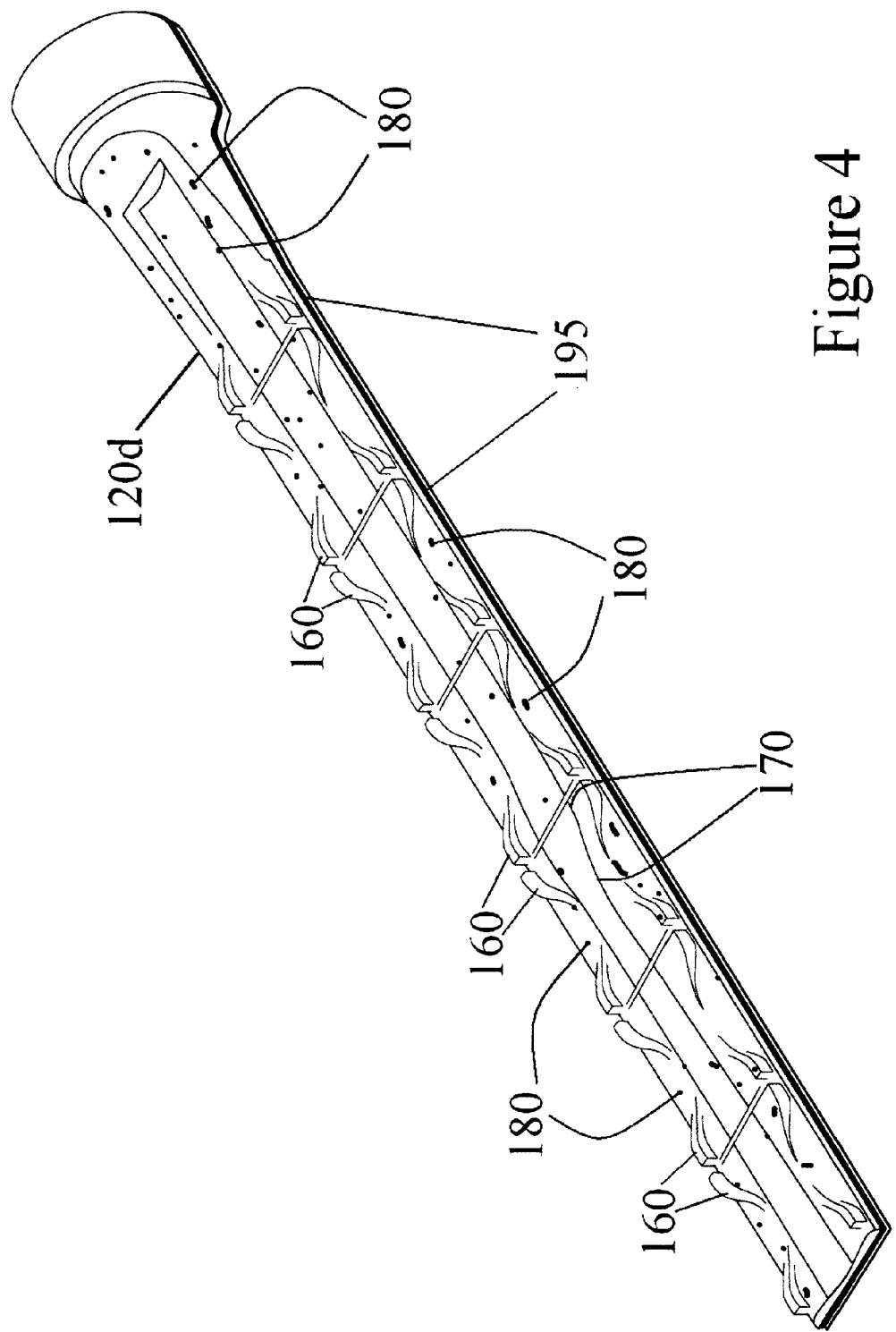
FIG. 4, is depiction of a baffle plug in accordance with the present invention including additional turbulence creating structures.

The surface of one or both of the sides of the blade may include additional turbulence creating structures to increase turbulence of the fluid flowing through the bore. Such structures are depicted in FIG. 4. Additional protrusions 160 may be placed on the surface of the blade 120d. Similar to the peripheral protrusions, the additional protrusions 160 extend outwardly from the blade. The height of the protrusions 160 may be varied as needed to achieve the desired turbulence. Furthermore, the height of the protrusions 160 may be varied within each peripheral protrusion. The protrusions 160 may have any type polygonal shape or may have an arcuate shape similar to the peripheral protrusions. The surface of the blade 120d may also have an undulating surface 170, ribs, and/or a rough surface 180 to aid in providing a turbulent fluid flow across the surface of blade 120d. The rough surface 180 may have a specific grain or sandpaper texture. By increasing the turbulence of the fluid circulated through the bore, the overall heat distribution of the fluid is increased thereby improving the cooling efficiency of the baffle-bore operation.

The width of the blade should be proximate to the inner diameter of the bore in which the baffle plug is used. Each blade is preferably shaped so that the outer edge of the blade snugly engages the inner wall of the bore to seal the inlet passageway from the outlet passageway. To improve the seal between the blade and the inner wall of the bore, the blade may have arcuate outer edges which engage the inner wall of the bore. In an alternative embodiment of the present invention, as shown in FIG. 4, the edges 190 of the blade 120d may be overmolded with a rubber-type material 195 having an elasticity less than the material forming the blade to improve the seal between the blade 120d and the inner wall of the bore.

In another embodiment of the present invention, as shown in FIG. 5, the edges 197 of the blade of the baffle comprise a tapered shape to improve the seal between the blade and the inner wall of the bore.

The baffle plug in accordance with the present invention may be formed from any material having a rigidity which provides for the direction of a fluid through a bore. The material should also be capable of withstanding the conditions (temperature, pressure, reactivity with fluid) within the bore. Preferably, the baffle plug is formed from a polymeric material. More preferably, the baffle plug is formed from thermoplastic polymer. Phthalate containing polymers are preferable materials used in accordance with the present invention. To increase rigidity of the polymer a glass additive may be added to the thermoplastic polymer. The melting point and glass transition temperatures of the material may be varied as needed by varying the amounts of the thermoplastic polymer and the glass additive. A preferred composition for forming the baffle plug of the present invention comprises 33 to 66 wt % of a thermoplastic polymer, such as AS-1945 Amodel Thermoplastic, and 33 to 66 wt % glass filled nylon. In this preferred embodiment, the nylon contains 44% glass. Such composition can withstand fluids having a temperature in the range of 320-400° F. (~160-205° C.). The thermoplastic composition of baffle plug allows the baffle plug to operate at higher temperatures than baffles made of brass and copper.

Shown in FIG. 6, is a depiction of an injection mold 500 showing the flow of a cooling fluid therethrough. As the cooling fluid enters the bore 200, the fluid contacts the blade 120 and is directed through the inlet passageway toward the distal end of the bore 200 by the fluid directing channel and the peripheral protrusions. While flowing through the inlet passageway, the fluid is also directed toward the longitudinal axis of the blade 120 by the peripheral protrusions. The surface features of the first side of the blade 120 act to provide a turbulent fluid flow for the fluid flowing therethrough. Upon reaching the distal end of the bore 200, the fluid exits the inlet passageway and flows around the distal end of the blade 120 thereby entering the outlet passageway. The fluid then flows through the outlet passageway in a manner similar to flowing through the inlet passageway and exits the bore 200.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A baffle plug comprising
    a base; and
    a planar blade extending outwardly from said base, said planar blade having a first side and a second side, at least one of said sides having at least one fluid directing channel longitudinally extending along at least a portion of the length of said planar blade;
    wherein said planar blade has a plurality of peripheral protrusions disposed along at least a portion of the periphery of at least one side of said planar blade; and
    wherein said plurality of peripheral protrusions are disposed in a wave-like arrangement along at least a portion of the periphery of said planar blade.

2. The baffle plug according to claim 1, wherein one or more of the edges of the blade are overmolded with a rubber-type material having an elasticity less than the blade material.

3. The baffle plug according to claim 1, wherein said baffle plug comprises 33 to 66 wt % of a thermoplastic polymer and 33 to 66 wt % of a glass filled nylon.

4. A baffle plug comprising
    a base; and
    a planar blade extending outwardly from said base, said planar blade having a first side and a second side, at least one of said sides of said planar blade having a series of marked length gradations on the surface thereof;
    wherein said planar blade has a plurality of peripheral protrusions disposed along at least a portion of the periphery of at least one side of said planar blade.

5. The baffle plug according to claim 4, wherein said plurality of peripheral protrusions are disposed in a wave-like arrangement along at least a portion of the periphery of said planar blade.

6. The baffle plug according to claim 4, wherein one or more of the edges of the blade are overmolded with a rubber-type material having an elasticity less than the blade material.

7. The baffle plug according to claim 4, wherein said baffle plug comprises 33 to 66 wt % of a thermoplastic polymer and 33 to 66 wt % of a glass filled nylon.

* * * * *